June 23, 1953            D. B. PECK           2,642,625
PROCESS FOR PRODUCING THIN POLYTETRAHALOETHYLENE FILMS
Filed June 23, 1950
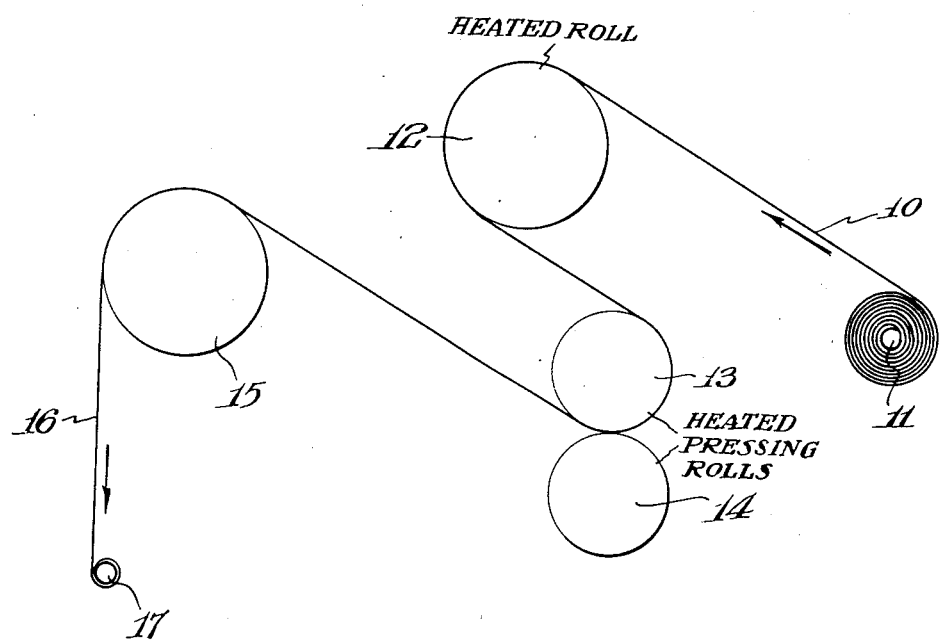
INVENTOR
D. B. PECK Patented June 23, 1953

2,642,625

UNITED STATES PATENT OFFICE 2,642,625

PROCESS FOR PRODUCING THIN POLYTETRAHALOETHYLENE FILMS

David B. Peck, Williamstown, Mass., assignor to Sprague Electric Company, North Adams, Mass., a corporation of Massachusetts Application June 23, 1950, Serial No. 169,797

3 Claims. (Cl. 18—47.5)

This invention relates to a process for producing electrical insulation and more particularly relates to extremely thin flexible films of polytetrafluoroethylene resin.

The high temperature stability of polytetrahaloethylenes and in particular polytetrafluoroethylene has led to their use wherever possible for high temperature insulating purposes. However, the fabrication and processing of these resins to give thin flexible layers, sheets and coatings have been at best difficult. Thin layers of the resins may be deposited on metal and other surfaces by deposition of resin particles from a suspension thereof, followed by sintering of the particles. While these layers may be very thin, it is difficult to remove them from the base to provide unsupported flexible films with optimum properties. Films on the order of 0.0005" (.5 of a mil.) in thickness are extremely fragile when produced by the aforesaid method and also do not possess the optimum electrical properties of the "cold worked" resin.

The preparation of thin films from such resins by extrusion methods has not met with much success. Polytetrafluoroethylene, once cured, cannot be extruded into thin films by conventional processes. The extrusion of polytrifluoromonochloroethylene is somewhat simpler but the high temperatures and pressures involved render it also a process not adapted to commercial use.

Films of polytetrafluoroethylene can be prepared in thicknesses as low as about 0.002" (2 mils.) by a pressure sintering of a large block of resin followed by shaving of a thin film of the resin block by use of a lathe and microtome type cutting knife. These films are tough and relatively useful where thicknesses on the order of 2 mils. or more may be tolerated. In the fabrication of electrical capacitors, however, dielectric thicknesses totaling 1 mil. or less are most frequently desired. And to make up this total thickness more than one layer of dielectric is almost without exception employed in order to substantially eliminate the possibility of dead short circuit caused by conducting particles or holes in the dielectric layers. While it is therefore possible to build electrical capacitors stable at high temperatures and which possess excellent electrical properties, it is not possible to do so in anything approaching a reasonable cubic volume. This is particularly true in the case of capacitors to be operated at a voltage of 1000 or less wherein total dielectric thickness of 1 mil. is ample.

It is an object of the present invention to overcome the foregoing and related disadvantages. A further object is to produce extremely thin polytetrahaloethylene resin films by a simple and novel process. A still further object is to produce polytetrafluoroethylene resin films of a thickness of about 0.5 mil.

These objects are attained in accordance with the present invention wherein there is employed a process for producing polytetrahaloethylene films less than 1 mil. in thickness which comprises subjecting films of said resin greater than about 1 mil. in thickness to high calender roll pressure with an ambient temperature sufficient to maintain the resin temperature at the point of calendering above the transition point of the resin, that is the temperature at which the resin undergoes a phase change and a sharp drop in tensile strength.

In a more restricted sense, the invention is concerned with a process for producing polytetrahaloethylene films less than about 1 mil. in thickness which comprises stretching films of said resin greater than about 1 mil. in thickness and calendering said stretched film under high pressure at an ambient temperature sufficient to maintain the resin temperature at the calendering point above the transition point of the resin.

In one of its preferred and limited embodiments, the invention is concerned with a process for producing polytetrafluoroethylene films substantially less than 1 mil. in thickness which comprises stretching a film of said resin of about 2 mils. thickness in a single direction to a length of at least about twice the original length in said direction and passing said stretched film through high pressure calender rolls whose axes are perpendicular to the direction of said stretching and which are maintained at an ambient temperature sufficient to maintain the temperature of the resin film at the point of calendering above the transition point of the resin.

I have made the startling discovery that extremely thin films of polytetrahaloethylene resins and in particular polytetrafluorethylene can be made on a continuous high speed process which involves essentially a pre-stretching of a moderately thick film of said resin followed by high pressure calendering under a special set of temperature conditions. The pre-stretching is normally conducted in a single direction and is carried out at a temperature below the transition joint of the resin. Thus it is in a sense a cold working of the resin, although normally the working temperature is somewhat above room temperatures. The calendering operation is conducted between highly polished calender rolls which preferably drive under very high pressure at the same peripheral speed. To secure optimum results I have found that the calender rolls should be heated to a temperature of 100° C. or more, usually between about 100° C. and about 250° C. depending on the resin which is to be converted to the extremely thin but tough form. While I am not fully aware of the reasons therefor, it appears that the frictional heat developed within the resin at the calendering line must not be dissipated so rapidly that the resin temperature drops below the transition point. Thus the hot calender rolls, instead of serving to heat the resin, appear to serve as a moderately high temperature ambient medium preventing excessive loss of frictional heat. The calendering is advisably carried out with rolls whose axes are perpendicular to the line of resin stretching.

In addition to being able to prepare thin dielectric films by an inexpensive and continuous process under the present invention, I find that the films so produced possess physical properties such as tensile strength and electrical properties such as dielectric strength which are higher per unit measure than that of the original resin film processed.

The types of resins which may be processed in accordance with the present invention are numerous. Among these resins are the polytetrahalo resins such as polytetrafluoroethylene and polymonochlorotrifluoroethylene resins which are extremely difficult to fabricate in extremely thin films by prior processes. The normal starting material applied in accordance with my invention is a moderately thick resin film normally from about 1 mil. to about 4 mils. in thickness which can be produced by shaving of the resin from a block thereof, extruding, casting or other means. It is contemplated that other resins such as the vinyls, styrene types, rubber and the like might be processed in accordance with the invention.

The invention will be further described with reference to the appended drawing in which 10 represents the starting film which unwinds from tension spool 11. The latter is provided with a brake arrangement to maintain the proper tension on film 10 for the linear stretching step. Film 10 passes over stretching roll 12 which is normally warm and is drawn into calendering rolls 13 and 14. The driving speed of rolls 13 and 14 exceeds the unwinding speed of spool 11 in accordance with the desired amount of stretch applied to the resin prior to the calendering. Rolls 13 and 14 are highly polished and bear against each other at very high pressures, ordinarily between 1 and 50 tons per lineal inch being applied to calender rolls having diameters of from 1 to 20 inches. The temperature of these calender rolls is sufficient to maintain the resin film at the point of calendering above its transition point. In the case of thin polytetrafluoroethylene films the roll temperature is normally between about 100° C. and 250° C. depending upon the calender roll pressure and the rolling speed. With polytrifluoromonochloroethylene, temperatures ordinarily between about 100° C. and 160° C. are maintained as the transition point is lower with this resin than with the tetrafluoro resin. The transition temperature of polytetrafluoroethylene resin is 320° C. to 327° C. at atmospheric pressure. At higher pressures transition appears to take place at lower temperatures. It appears that the frictional heat developed in the resin at the calendering point raises the film temperature above the transition point.

The thin, flexible dielectric film 16 which passes from calender rolls 13 and 14 may be run over roll 15 which is normally cool and to take up roll 17 which maintains a slight positive pull on film 16 to prevent wrinkling of the latter.

In a typical experiment polytetrafluoroethylene film was prepared in a thickness of 2 mils. by shaving the film from a solid molded rod of the resin. This film, which is slightly opaque and cloudy in appearance, was processed in accordance with the invention by passing over stretching roll 12 with a tension of about 2½ pounds per inch width of polytetrafluoroethylene resin to increase the length of the film by a factor of about 2.3. Stretching roll 12 was maintained at 150° C. The film at this point was very cloudy and structurally weak. The film was then passed through the calendering rolls which were maintained at 150° C. by steam heat and under a compressive force of 25 tons on 8" diameter rolls (sample was 2" wide). The calendering speed, that is the speed of the film from the calender, was about 60 feet per minute. Resulting film was transparent and very tough, possessing a thickness of about 0.6 mil. The dielectric strength of this thin film as determined by a mercury immersion test varied from about 2000 to 2600 volts per mil., the average being about 2300.

A capacitor was made up from the film by winding two thin aluminum foils with a total of four layers of the film. The resulting capacitor could be operated at 200° C. without failure. Another capacitor of the same type was placed in a metal tube whose inner diameter was the same as the outer diameter of the capacitor winding and the resulting assembly heated at 375° C. for 25 minutes. After cooling, the capacitor slid from the metal tube and the resin was found to be fused on the edges of the winding. Despite this fact, the capacitor was still electrically operative and possessed extreme capacity and temperature stability.

Capacity

| 190° C | 25° |
|---|---|
| 0.0409 mfd. | 0.0402 |

At each of these temperatures the power dissipation factor at 1000 cycles was less than 0.01%.

Similar films have been prepared from 1.5 mil. polytrifluoromonochloroethylene with a calendering and stretching roll temperature of about 100° C. The resultant film was clear and about 0.5 mil. in thickness.

The opacity of the disclosed polymers is reduced by my process to such a degree that they become highly transparent and resemble clear cellophane. If desired, the resin films may be laminated with metal on one or both sides during or after the thickness reducing step. The invention may also be practiced on resin films which are loaded with ceramic particles and the like to effect an increase in the dielectric constant and/or to modify certain final properties such as opacity, thermoplastic flow and the like. Also, uniform layers of ceramic powder may be introduced on the calender rolls and calendered into the resin film during the calendering step.

Resin films substantially less than 0.5 mil.

have been produced by the present invention and have made possible the fabrication of exceedingly small electrical capacitors and other related devices. Because of the temperature stability of the polytetrahaloethylene resins the thin films may be metallized on one or both sides for the preparation of metallized film capacitors with exceedingly small physical volume.

It is to be understood that the invention is not limited to a single stretching and calendering operation as the film resulting from a single treatment may be re-processed to form an even thinner dielectric sheet.

What is claimed is:

1. A process for producing polytetrafluoroethylene films containing ceramic particles substantially less than 1 mil. in thickness which comprises stretching a film of said resin containing ceramic particles of about 2 mils. thickness in a single direction to a length of at least about twice the original length in said direction and passing said stretched film through high pressure calender rolls whose axes are perpendicular to the direction of said stretching and which are maintained at an ambient temperature sufficient to maintain the resin film at the point of calendering above the transition point of the resin.

2. A process for producing polytetrafluoroethylene films substantially less than 1 mil. in thickness which comprises stretching a film of said resin of about 2 mils. thickness in a single direction to a length of at least about twice the original length in said direction and passing said stretched film through high pressure calender rolls whose axes are perpendicular to the direction of said stretching and which are maintained at an ambient temperature sufficient to maintain the resin film at the point of calendering above the transition point of the resin.

3. A process for producing polytetrahaloethylene films less than 1 mil. thick which comprises subjecting a resin film of about 2 mil. thickness to a compressive calendering roll pressure of between 1 and 50 tons per lineal inch as applied to the resin film through the medium of several calendering rolls having a diameter of from 1 to 20 inches and having an ambient temperature sufficient to maintain the resin temperature at the point of calendering above the transition point.

DAVID B. PECK.

References Cited in the file of this patent

UNITED STATES PATENTS

| Number | Name | Date |
|---|---|---|
| 2,183,550 | Deutschmann | Dec. 19, 1939 |
| 2,223,833 | Sander | Dec. 3, 1940 |
| 2,400,099 | Brubaker et al. | May 14, 1946 |
| 2,406,127 | Alfthan | Aug. 20, 1946 |

OTHER REFERENCES

Ind. and Eng. Chem., pages 871–877, Sept. 1946.